United States Patent
Lesnau, IV et al.

(10) Patent No.: US 8,375,800 B2
(45) Date of Patent: Feb. 19, 2013

(54) COMPRESSION SENSOR GASKET AND METHOD OF CONSTRUCTION

(75) Inventors: Edward Lesnau, IV, Livonia, MI (US); James R. Zwick, Brighton, MI (US); Marcin Fracz, West Bloomfield, MI (US)

(73) Assignee: Federal-Mogul Corporation, Southfield, MI (US)

( * ) Notice: Subject to any disclaimer, the term of this patent is extended or adjusted under 35 U.S.C. 154(b) by 712 days.

(21) Appl. No.: 12/572,366

(22) Filed: Oct. 2, 2009

(65) Prior Publication Data

US 2010/0083740 A1    Apr. 8, 2010

Related U.S. Application Data

(60) Provisional application No. 61/102,380, filed on Oct. 3, 2008.

(51) Int. Cl.
*G01L 7/14* (2006.01)
(52) U.S. Cl. ........................................ 73/744
(58) Field of Classification Search .............. 73/760, 73/744, 114.18
See application file for complete search history.

(56) References Cited

U.S. PATENT DOCUMENTS

| | | | | |
|---|---|---|---|---|
| 3,952,691 A * | 4/1976 | Peltz et al. | ..... | 116/272 |
| 4,686,861 A * | 8/1987 | Morii | ..... | 73/862.68 |
| 5,659,132 A | 8/1997 | Brady | | |
| 6,701,775 B1 | 3/2004 | Popielas et al. | | |
| 6,945,117 B2 | 9/2005 | Boyd et al. | | |
| 7,004,472 B2 | 2/2006 | Diez et al. | | |
| 7,096,725 B2 * | 8/2006 | Vialard | ..... | 73/114.18 |
| 7,111,505 B2 * | 9/2006 | Kestly et al. | ..... | 73/114.18 |
| 7,310,993 B2 * | 12/2007 | Popielas et al. | ..... | 73/35.12 |
| 7,322,247 B2 * | 1/2008 | Boyd et al. | ..... | 73/729.1 |
| 7,857,036 B2 * | 12/2010 | Bergqvist et al. | ..... | 165/11.1 |

FOREIGN PATENT DOCUMENTS

JP    2002-349336 A    12/2002

* cited by examiner

*Primary Examiner* — Max Noori
(74) *Attorney, Agent, or Firm* — Robert L. Stearns; Dickinson Wright, PLLC

(57) ABSTRACT

A compression sensor gasket and method of construction thereof is provided. The gasket has a body with opposite sealing surfaces and a through passage configured to align with a chamber to be sealed. A through opening extends between the sealing surfaces to the through passage and has an annular chamfered surface. A pressure sensor assembly having a housing and a pressure sensor extending at least partially through the housing is disposed in the through opening. The pressure sensor has a pressure sensor tip configured to sense pressure within the chamber to be sealed. The housing has an outer annular tapered surface configured to register in radial alignment with the chamfered surface to facilitate forming a hermetic seal between the pressure sensor assembly and the gasket body.

15 Claims, 3 Drawing Sheets

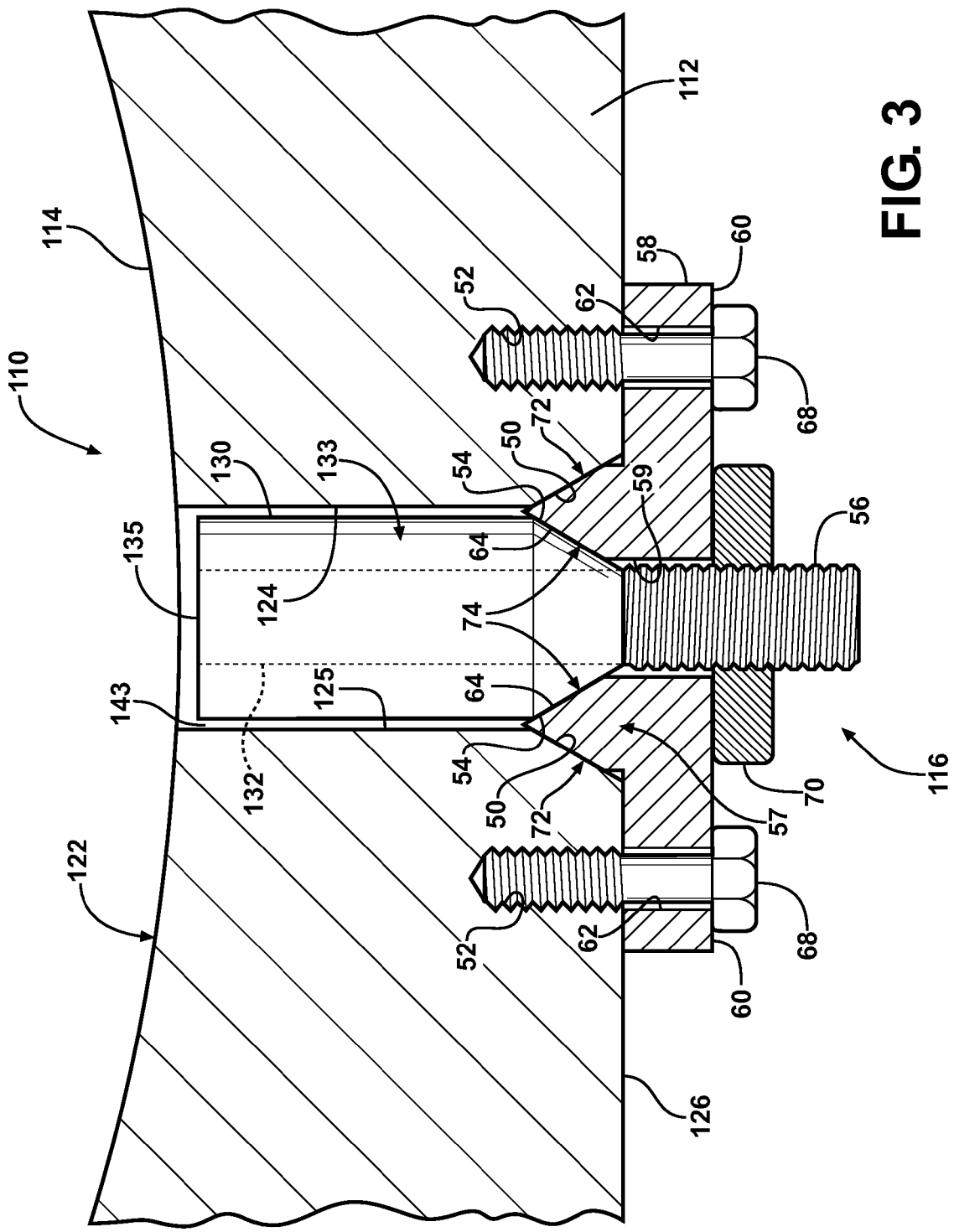

COMPRESSION SENSOR GASKET AND METHOD OF CONSTRUCTION

CROSS-REFERENCE TO RELATED APPLICATION

This application claims the benefit of U.S. Provisional Application Ser. No. 61/102,380, filed Oct. 3, 2008, which is incorporated herein by reference in its entirety.

BACKGROUND OF THE INVENTION

1. Technical Field

This invention relates generally to internal combustion engines, and more particularly to compression gaskets for forming a seal about a chamber within an internal combustion engine.

2. Related Art

Internal combustion engines have chambers in which high pressures are generated. Typically, it is desirable to maintain a predetermined pressure within the chambers, such as in oil passages, coolant passages, or cylinder bores, for example, without permitting gas and/or fluid to leak from the chambers. Generally, a pair of members mate with one another to form the chamber or chambers, such as a cylinder head and engine block, for example, with a gasket being received between the members to provide a gas/fluid tight seal between the members and about the chamber. In addition to the gasket, it is known to provide a separate pressure sensor to indicate the pressure within the chamber. If the pressure falls outside a predetermined limit, a signal can be sent to indicate a service condition. Having separate components typically comes at an added cost, both in manufacture and assembly.

Some attempts have been made to provide a single component gasket and compression sensor. However, these attempts are not believed to have been successful due to an increased cost associated therewith, particularly during manufacture and/or service. The known gasket/sensor assemblies must be replaced in their entirety during service, thereby leading to the increased cost of having to replace both the gasket and the sensor. Accordingly, what is needed is a gasket and sensor assembly that can provide a reliable seal between mating members, provide an accurate indication of the pressure within the cavity being sealed, and be provided in an economical fashion, both in manufacture and in use.

SUMMARY OF THE INVENTION

A compression sensor gasket includes a gasket body having opposite substantially planar sealing surfaces and a through passage configured to align with a chamber to be sealed. A through opening extends between the sealing surfaces to the through passage, with the through opening having an annular chamfered surface. The gasket further includes a pressure sensor assembly having a housing and a pressure sensor extending at least partially through the housing. The pressure sensor has a pressure sensor tip configured to sense pressure within the chamber to be sealed. The housing has an outer annular tapered surface configured to register in radial alignment with the chamfered surface to facilitate forming a hermetic seal between the pressure sensor assembly and the gasket body.

In accordance with another aspect of the invention, the pressure sensor assembly has one of a male or female threaded portion and the gasket body has the other of the male or female threaded portion, wherein the male threaded portion is configured for threaded engagement with the female threaded portion to attach the gasket body to the pressure sensor assembly.

In accordance with another aspect of the invention, the housing is configured for compressed, mechanical sealing engagement with the gasket body.

In accordance with another aspect of the invention, the housing is configured for compressed engagement with the sensor upon compressing the housing into engagement with the gasket body.

In accordance with another aspect of the invention, the gasket body has a chamfered inner surface and the housing has a tapered outer surface configured to deflect radially inwardly upon engagement with the chamfered outer surface.

In accordance with another aspect of the invention, a method of constructing a pressure sensor gasket for sensing pressure within a cavity of an internal combustion engine is provided. The method includes providing a gasket body having opposite substantially planar sealing surfaces and a through passage configured to align with a chamber to be sealed with a through opening extending between the sealing surfaces to the through passage. The method further includes providing a sensor assembly extending to a sensor tip arranged adjacent the through passage and disposing the pressure sensor assembly in the through opening. Then, the method includes forming a mechanical compression seal between the through opening and the pressure sensor assembly to prevent fluid from passing between the gasket body and the pressure sensor assembly.

In accordance with yet another aspect of the invention, the method further includes providing the pressure sensor assembly with an outer housing and a pressure sensor extending axially through the housing and compressing the housing into sealed abutment with the pressure sensor.

In accordance with yet another aspect of the invention, the method further includes maintaining the pressure sensor assembly out of direct contact with the gasket body.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 3 is a partial cross-sectional view of a compression sensor gasket assembly constructed in accordance with another presently preferred aspect of the invention.

DETAILED DESCRIPTION OF PRESENTLY PREFERRED EMBODIMENTS

Figure 1:
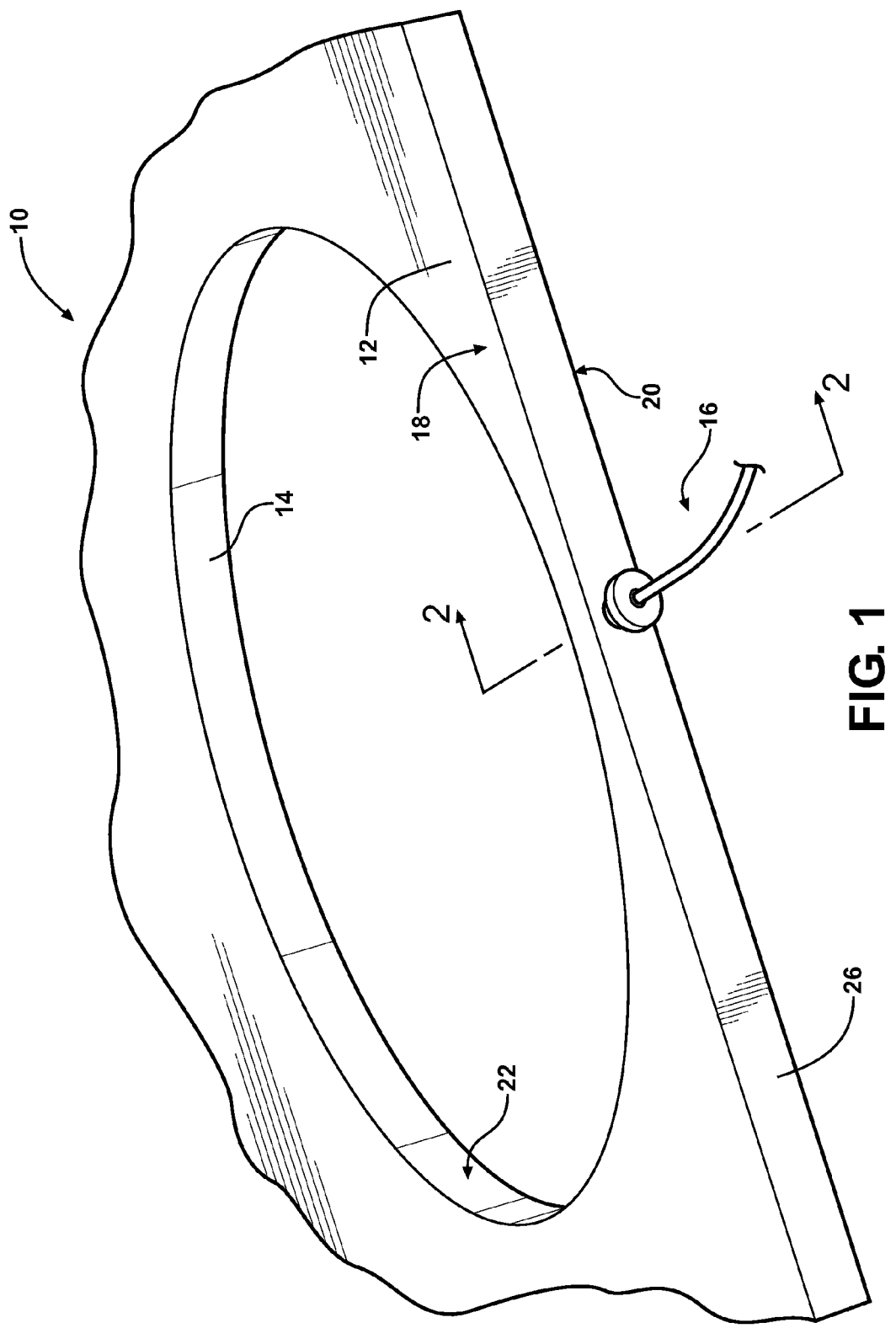
FIG. 1 is a partial perspective view of a compression sensor gasket assembly constructed in accordance with one presently preferred aspect of the invention.

Referring in more detail to the drawings, FIG. 1 illustrates a portion of a compression sensor gasket assembly, referred to hereafter as gasket 10, constructed in accordance with one presently preferred embodiment of the invention. The gasket 10 has a metal distance layer, also referred to hereafter as a gasket body 12, with one or more through passages 14 for the passage of fluid or gas therethrough, such for a cylinder head gasket, for example. Accordingly, the number of passages 14 is provided to correspond with the number of cylinders in an internal combustion engine, and to provide for fluid passages, such as oil or coolant, for example. The gasket 10 also has at least one pressure sensor assembly 16, and preferably a corresponding number of pressure sensor assemblies to the number of through passages 14 releasably attached in fluid/gas tight sealed engagement with the gasket body 12. The pressure sensor assemblies 16 are configured to sense pressure independently from one another within their respective through passage 14 and within the chamber being sealed. In service, the gasket 10 can be removed from between the members being clamped and sealed together, whereupon the pressure sensor assemblies 16 can be selectively and independently removed from the gasket body 12 and replaced independent of the gasket body 12, if desired.

Figure 2:
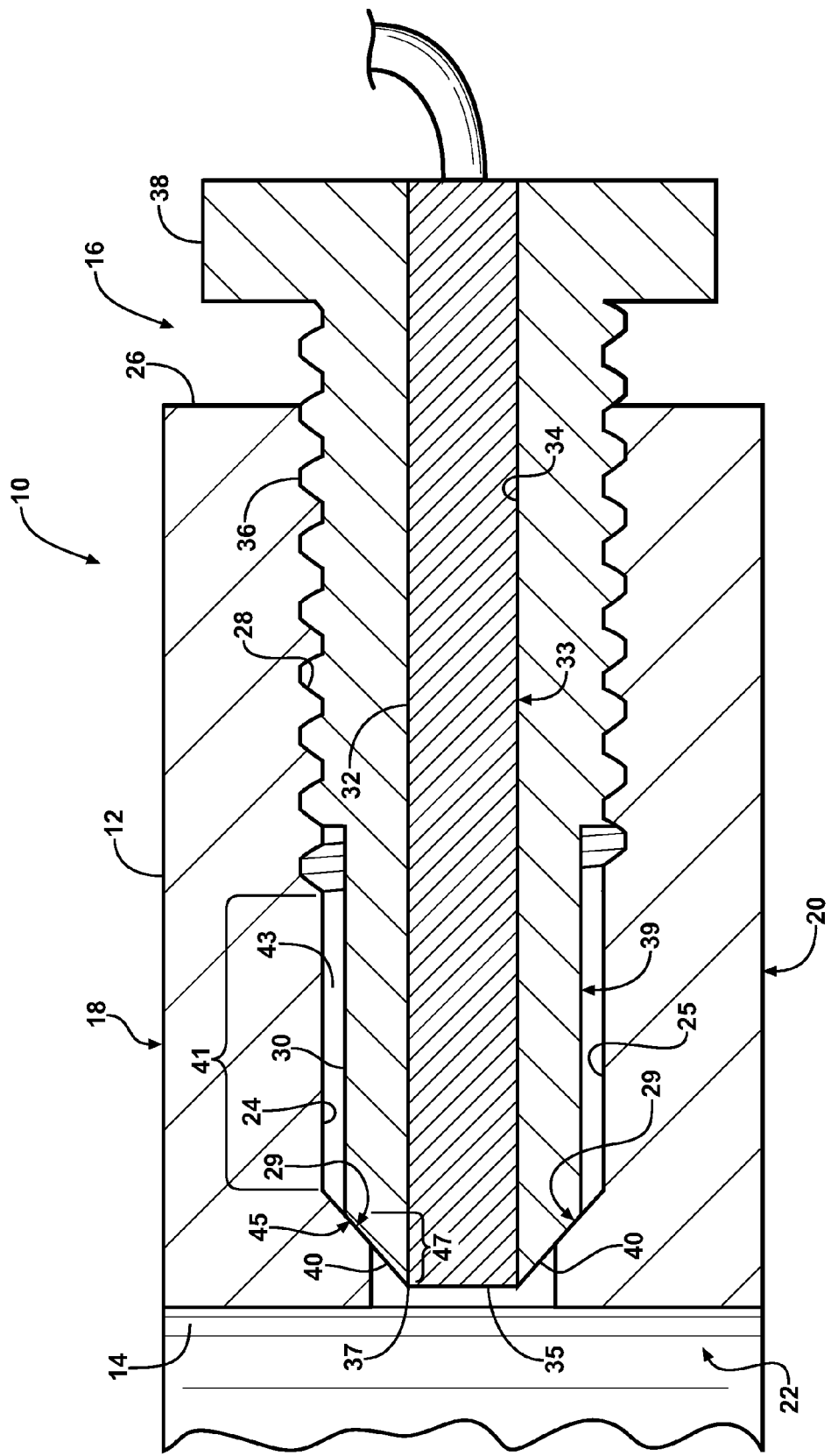
FIG. 2 is cross-sectional view taken generally along the line 2-2 of FIG. 1.

The gasket body 12 can be provided as a substantially flat body, having opposite sides providing substantially planar sealing surfaces 18, 20, while sealing beads (not shown) can be formed to extend throughout the body 12, as desired. The through passages 14 have an inner periphery, also referred to as inner surface 22, corresponding to the diameter of the chambers, such as a cylinder bore, for example, being sealed. As best shown in FIG. 2, to facilitate attaching the pressure sensor assembly or assemblies 16 to the gasket body 12, the gasket body 12 has through openings 24 extending from an outer edge, also referred to as outer periphery 26, through to each through passage 14. Each through opening 24 is completely enclosed substantially along its length and bounded by the opposite sides 18, 20 of the gasket body 12, although regions could be open, if desired. As such, the through openings 24 are generally open only adjacent the inner and outer peripheries 22, 26.

Still referring to FIG. 2, to facilitate attaching each pressure sensor assembly 16 in fluid/gas sealed relation within the respective through opening 24, the through openings 24 are formed having an annular tapered or chamfered conical surface 29, shown here as extending radially inwardly from a generally cylindrical inner wall 25 and converging toward the through passage 14. In addition, each through opening 24 has a tapped, female thread portion 28 formed in the cylindrical wall 25 adjacent the outer periphery 26.

Still with regard to the embodiment shown in FIG. 2, by way of example and without limitation, the pressure sensor assembly 16 has a housing 30 configured for compressed fluid/gas tight sealed engagement within the through opening 24 of the gasket body 12 and a pressure sensor 32 configured for fluid/gas tight sealed engagement within in the housing 30.

The pressure sensor 32 is sealingly fixed in the through opening 24 of the gasket body 12. The pressure sensor 32 can be provided of any suitable type of material, such as a fiber optic, for example. The pressure sensor 32 is represented as having a body with a cylindrical or substantially cylindrical outer surface 33 sized for receipt within the housing 30. The outer surface 33 of the pressure sensor 32 extends axially through the housing 30 and is shown as having a sensor tip 35 positioned flush or substantially flush with a free end 37 of the housing 30. Upon being fixed in the through opening 24 of the gasket body 12, the pressure sensor 32 is suitably position adjacent the through passage 14 to detect pressure within the chamber being sealed.

The housing 30 has a central through passage 34 and an outer surface 39. The through passage 34 is represented here, by way of example and without limitation, as being cylindrical or substantially cylindrical and sized for close or slightly tight receipt of the outer surface 33 of the sensor 32 therein. The outer surface 39 has a portion configured for threaded attachment with the female thread portion 28 in the through opening 24 of the gasket body 12, represented as a male threaded portion 36 located axially between a tool receiving head 38 and the free end 37. The head 38 is preferably configured, such as having a hex shaped outer configuration, for example, for receipt of a tool to facilitate tightening and loosening the sensor 32 in the through opening 24. The outer surface 39 also has a cylindrical or substantially cylindrical portion 41 extending between the male threaded portion 36 and the free end 37. To facilitate ease of assembly and the formation of a hermetic seal between the pressure sensor assembly 16 and the gasket body 12, the portion 41 has a slightly reduced diameter from the cylindrical wall 25 of the through opening 24, thereby providing an annular gap 43 between the outer surface 39 and the cylindrical wall 25 upon assembly. The cylindrical portion 41 transitions to an annular tapered nose 40 adjacent or immediately adjacent the free end 37, wherein the tapered nose 40 is shown as extending and converging flush or substantially flush with the free end 37. The tapered nose 40 has an annularly tapered, conical surface 45 configured to matingly abut the annular chamfered surface 29 of the gasket body 12 in fluid/gas tight sealed relation therewith. While fastening the pressure sensor assembly 16 within the through opening 24, the housing 30 is caused to move axially within the through opening 24 while the annular gap 43 permits the nose 40 to be guided in freely centered relation within the annular conical surface 29 and compressed into cammed, mating abutment with the radially aligned conical surface 29 of the gasket body 12. As such, the nose 40 is caused to be biased and/or deformed radially inwardly to bring a region 47 of the through passage 34 that is radially aligned with the tapered surface 45 into compressed fluid/gas tight sealed engagement with the outer surface 33 of the centrally extending pressure sensor 32. Accordingly, the mechanically formed seals established between the radially aligned abutting annular tapered surfaces 29, 45 and between the radially aligned inner surface of the through passage 34 and the outer surface 33 of the pressure sensor 32 form a hermetic seal between the pressure sensor assembly 16 and the chamber, e.g. combustion chamber, being sealed. Accordingly, no fluid or gas is able to escape through the through opening 24 in the gasket body 12 or through the through passage 34 in the housing 30. To facilitate forming the hermetic seals, the housing 30 can be formed from a material relatively soft in comparison to the material used to construct the gasket body 12, such as from brass, for example. As such, the softer material of the housing nose 40 is able to be readily deflected and/or deformed radially inwardly into hermetically sealed abutment with the outer surface 33 of the sensor 32 while the housing 30 is being moved axially within the through opening 24. Accordingly, the hermetic seal established via mechanical compression between the housing 30 and the gasket body 12, and between the housing 30 and the pressure sensor 32 negate the need for supplemental and potentially costly sealing mechanisms.

In FIG. 3, a cross-sectional view taken generally along a plane of a compression sensor gasket assembly, referred to hereafter as gasket 110, constructed in accordance with another aspect of the invention is shown, wherein the same reference numerals offset by a factor of 100 are used to identify similar features described above. The gasket 110 has a gasket body 112 constructed similarly as described above, having one or more through passages 114 for the flow of gas or fluid. Further, the gasket body 112 has an enclosed or substantially enclosed through opening 124 constructed having a cylindrical or substantially cylindrical inner wall 125 extending between an outer periphery 126 and an inner periphery 122. An annular tapered or chamfered surface, also referred to as a countersink 50, is formed adjacent the outer periphery 126 of the gasket body 112, shown as diverging outwardly from the inner wall 125 into flush or substantially flush relation with the outer periphery 126, for example. To facilitate attaching a pressure sensor assembly 116 in hermetically sealed relation to the gasket body 112, the outer periphery 126 has fastener openings, represented as threaded openings 52, extending into the outer periphery 126 on opposite sides of the through opening 124.

The pressure sensor assembly 116 has a pressure sensor 132 received in a pressure sensor housing 130, with the pressure sensor 132 extending to a pressure sensor tip 135 at one end for orientation adjacent the respective gas or fluid through passage 114. The pressure sensor assembly 116 has a generally cylindrical outer surface 133 sized for receipt, such as in a slightly loose fit, in the through opening 124, thereby providing an annular gap 143 between the outer surface 133 of the pressure sensor housing 130 and the inner wall 125 of the through opening 124. Further, the pressure sensor assembly 116 has a fastening portion including a conical, annularly tapered rear surface 54 converging away from the pressure sensor tip 135 and a male threaded stud 56 extending coaxially from the tapered rear surface 54 to an end opposite the pressure sensor tip 135. The tapered rear surface 54 is configured to register in radial alignment with the chamfered surface 50 to form an annular V-shaped recess 57 between the surfaces 50, 54 to facilitate forming a hermetic seal between the pressure sensor assembly 116 and the gasket body 112.

The gasket 110 further includes a sealing mount plate, referred to hereafter as mount plate 58. The mount plate 58 is constructed of metal, and preferably a soft metal, e.g. brass, for example. The mount plate 58 has an annular central through passage 59 sized for a clearance fit of the sensor threaded stud 56 therethrough. The mount plate 58 further includes a pair of laterally extending mount flanges 60 configured for flush or substantially flush abutment with the outer periphery 126 of the gasket body 112. To facilitate fastening the mount plate 58 to the gasket body 112, the mount flanges 60 have through openings 62 configured for alignment with the threaded openings 52 in the gasket body 112. To provide a hermetic, fluid/gas tight seal between the gasket body 112 and the pressure sensor housing 130, the mount plate 58 has an annular, wedge-shaped boss or peak 64 extending axially outwardly from the through passage 59. The angles of inclination of surfaces forming the wedge-shaped peak 64 are predetermined for receipt in the V-shaped recess 57 to provide a snug, tight mating fit of the peak 64 within the V-shaped recess 57 established between the tapered rear portion 54 of the pressure sensor housing 130 and the countersink 50 in the gasket body 112.

To assemble the pressure sensor assembly 116 to the gasket body 112, the pressure sensor housing 130 with the pressure sensor 132 received therein is disposed in a clearance fit in the through opening 124 with the sensor tip 135 facing and being configured generally flush with the through passage 114 of the gasket body 112. Accordingly, the pressure sensor housing 130 is maintained out of direct contact with the gasket body 112. The threaded stud 56 of the pressure sensor assembly 116 extends outwardly from the outer periphery 126 of the gasket body 112. With the pressure sensor and housing 130 in position, the mount plate 58 is then positioned over the threaded stud 56 with the threaded stud 56 extending through the through passage 59 and outwardly from the mount plate 58. Then, a pair of fasteners, e.g. threaded bolts 68, are disposed through the through openings 62 and fastened in the threaded openings 52 of the gasket body 112. This brings a radially outwardly facing annular tapered surface 72 of the annular peak 64 into fluid/gas tight sealed abutment with the countersink 50 of the gasket body 112. Then, a threaded nut 70 is secured to the threaded stud 56 and tightened to a predetermined torque, thus pulling the stud 56 axially rearwardly and the annular, tapered rear portion 54 of the pressure sensor housing 130 into fluid/gas tight sealed abutment with a radially inwardly facing annular tapered surface 74 of the annular peak 64. Accordingly, the tapered peak 64 of the mount plate 58 provides a mechanically formed hermetic seal against both the gasket body 112 and the pressure sensor housing 130. Further facilitating the formation of a hermetic seal is brought about by the peak 64 being formed of a relative soft material and thus, allowing the peak 64 to deform as needed to ensure a fluid/gas tight seal is established.

In both embodiments described above, the pressure sensor assemblies 16, 116 are hermetically sealed within the respective gasket body 12, 112 without the need to incorporate costly seal mechanisms. Further, any of the individual components of the gaskets 10, 110 can be replaced in service or in manufacture without having to replace other components, thereby reducing cost in service and in manufacture. Accordingly, the pressure sensors may be replaced in service, while the gasket bodies 12, 112 can remain in use, if desired.

Obviously, many modifications and variations of the present invention are possible in light of the above teachings. It is, therefore, to be understood that within the scope of the appended claims, the invention may be practiced otherwise than as specifically described.

What is claimed is:

1. A compression sensor gasket, comprising:
a gasket body having opposite substantially planar sealing surfaces and a through passage configured to align with a chamber to be sealed with a through opening extending between said sealing surfaces to said through passage, said through opening having an annular chamfered surface; and
a pressure sensor assembly having a housing and a pressure sensor extending at least partially through said housing, said pressure sensor having a pressure sensor tip configured to sense pressure within the chamber to be sealed and said housing having an outer annular tapered surface configured to register in radial alignment with said chamfered surface to facilitate forming a hermetic seal between said pressure sensor assembly and said gasket body, wherein said chamfered surface converges toward said through passage and said annular tapered surface is compressed into sealed abutment with said chamfered surface.

2. The compression sensor gasket of claim 1 wherein said tapered surface forms a nose of said housing and said pressure sensor extends through said nose, said nose being compressed radially inwardly into sealed engagement with said pressure sensor.

3. The compression sensor gasket of claim 2 wherein said housing has an outer surface adjacent said nose with an annular gap extending between said outer surface and said through opening of said gasket body.

4. The compression sensor gasket of claim 1 wherein said gasket body has a female threaded portion and said housing has a male threaded portion configured for threaded engagement with said female threaded portion.

5. The compression sensor gasket of claim 4 wherein said housing has an outer surface extending between said annular tapered surface and said male threaded portion with an annular gap extending between said outer surface and said through opening of said gasket body.

6. The compression sensor gasket of claim 1 wherein said through passage has a region radially aligned with said tapered surface, said region being biased into sealed abutment with said pressure sensor.

7. A compression sensor gasket, comprising:
a gasket body having opposite substantially planar sealing surfaces and a through passage configured to align with a chamber to be sealed with a through opening extending between said sealing surfaces to said through passage, said through opening having an annular chamfered surface;
a pressure sensor assembly having a housing and a pressure sensor extending at least partially through said housing, said pressure sensor having a pressure sensor tip configured to sense pressure within the chamber to be sealed and said housing having an outer annular tapered surface configured to register in radial alignment with said chamfered surface to facilitate forming a hermetic seal between said pressure sensor assembly and said gasket body; and
wherein said annular chamfered surface and said annular tapered surface are radially aligned with one another to form an annular recess, and further comprising a mount plate having an annular peak extending into said recess and forming a fluid tight seal between said annular chamfered surface and said annular tapered surface.

8. The compression sensor gasket of claim 7 wherein said mount plate is fastened to said gasket body with said annular peak sealingly abutting said chamfered surface.

9. The compression sensor gasket of claim 8 wherein said pressure sensor assembly is fastened to said mount plate with said annular peak sealingly abutting said tapered surface.

10. The compression sensor gasket of claim 9 wherein said mount plate has a through passage and said pressure sensor has a threaded stud extending away from said sensor tip through said through passage.

11. The compression sensor gasket of claim 9 further comprising a threaded nut fixed to said threaded stud and drawing said tapered surface into sealed abutment with said chamfered surface.

12. The compression sensor gasket of claim 7 wherein said housing is received in a clearance fit within said through passage.

13. A method of constructing a pressure sensor gasket for sensing pressure within a cavity of an internal combustion engine, comprising:
providing a gasket body having opposite substantially planar sealing surfaces and a through passage configured to align with a chamber to be sealed with a through opening extending between the sealing surfaces to the through passage;
providing a sensor assembly extending to a sensor tip arranged adjacent the through passage;
disposing the pressure sensor assembly in the through opening;
forming a mechanical compression seal between the through opening and the pressure sensor assembly to prevent fluid from passing between the gasket body and the pressure sensor assembly; and
providing the pressure sensor assembly with an outer housing and a pressure sensor extending axially through the housing and compressing the housing into sealed abutment with the pressure sensor.

14. The method of claim 13 further including moving the housing axially within the through opening to cause the compressing of the housing.

15. A method of constructing a pressure sensor gasket for sensing pressure within a cavity of an internal combustion engine, comprising:
providing a gasket body having opposite substantially planar sealing surfaces and a through passage configured to align with a chamber to be sealed with a through opening extending between the sealing surfaces to the through passage;
providing a sensor assembly extending to a sensor tip arranged adjacent the through passage;
disposing the pressure sensor assembly in the through opening;
forming a mechanical compression seal between the through opening and the pressure sensor assembly to prevent fluid from passing between the gasket body and the pressure sensor assembly; and
maintaining the pressure sensor assembly out of direct contact with the gasket body.

* * * * *